United States Patent [19]

Shogren et al.

[11] 4,095,880

[45] Jun. 20, 1978

[54] EXTENDED RANGE VARIABLE MAGNIFICATION REPRODUCTION MACHINE

[75] Inventors: David K. Shogren, Ontario; Edward C. Bock, Webster; Edwin Zucker, Rochester, all of N.Y.

[73] Assignee: Xerox Corporation, Stamford, Conn.

[21] Appl. No.: 590,906

[22] Filed: Jun. 27, 1975

[51] Int. Cl.$^2$ ...................... G03G 15/28; G03B 27/34

[52] U.S. Cl. .......................................... 355/8; 355/57; 355/66; 355/77

[58] Field of Search ...................... 355/3 R, 8, 11, 57, 355/66, 77

[56] References Cited

U.S. PATENT DOCUMENTS

| | | | |
|---|---|---|---|
| 3,542,467 | 11/1970 | Ferguson et al. | 355/8 |
| 3,614,222 | 10/1971 | Post et al. | 355/8 |
| 3,829,209 | 8/1974 | Buddendeck et al. | 355/14 |
| 3,894,801 | 7/1975 | Namba | 355/8 X |
| 3,897,148 | 7/1975 | Ritchie et al. | 355/57 |

*Primary Examiner*—Fred L. Braun

[57] ABSTRACT

A document reproduction machine having an extended range of magnifications employs a scanning optical system which is controlled as to scanning speed and distance of travel by the selected magnification. In an extended reduction copying range the speed of the scanning optical system is automatically increased in proportion to the selected magnification reduction, but the increase in scanning distance is limited to the platen size. A clutch mechanism is employed to terminate the normally increasing scanning distance in the extended reduction range.

31 Claims, 20 Drawing Figures

Fig. 10.
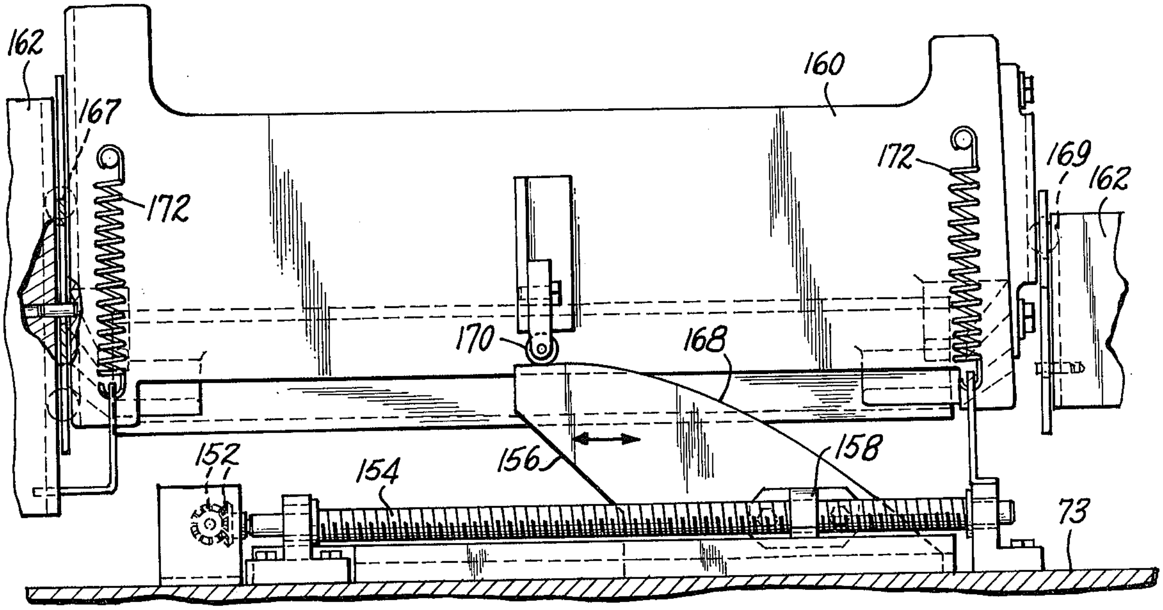
Fig. 11.
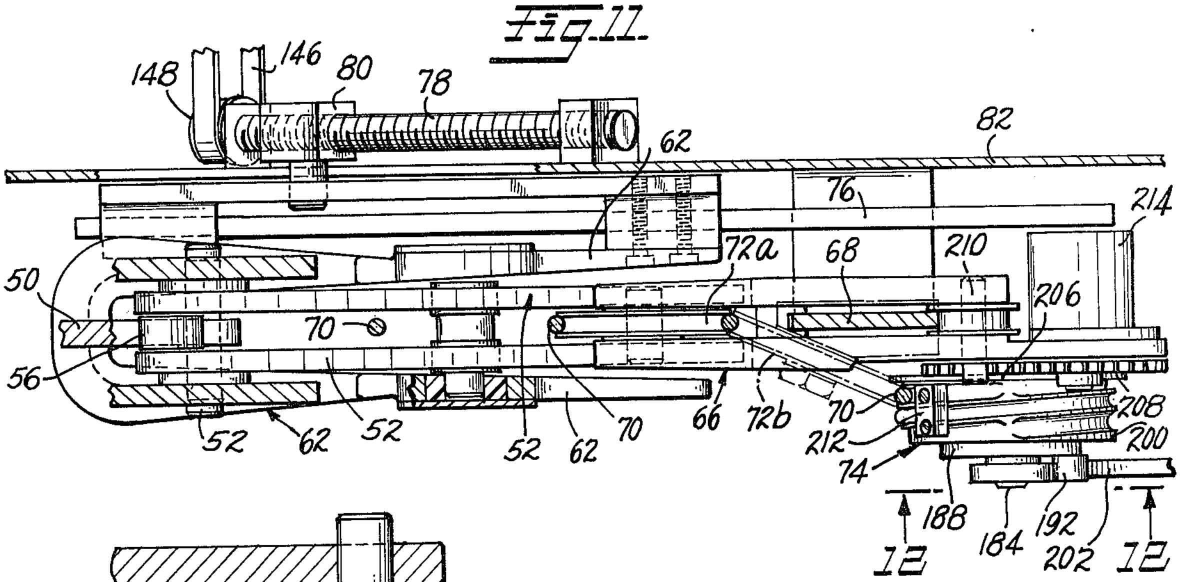
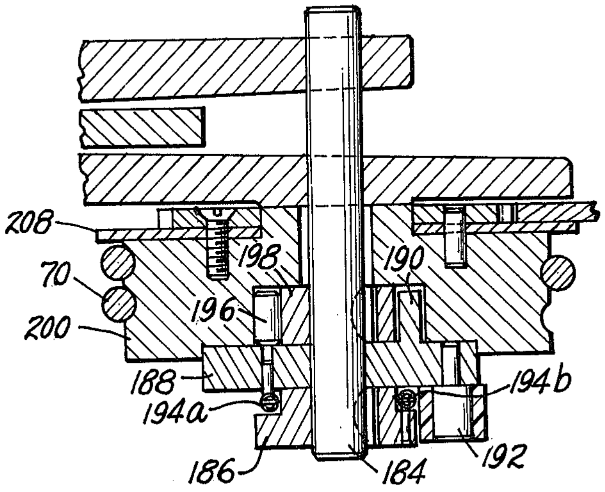
Fig. 14.

ENGAGED

DISENGAGED

EXTENDED RANGE VARIABLE MAGNIFICATION REPRODUCTION MACHINE

BACKGROUND OF THE INVENTION

1. Field of the Invention

The invention is in the field of variable magnification reproduction machines.

2. Description of the Prior Art

Variable magnification reproduction machines are known in the prior art as exemplified by U.S. Pat. Nos. 3,542,467, 3,778,147, 3,884,574 and 3,614,574. In machines having scanning optical systems, the selection of a desired magnification value is generally associated with a corresponding selection of optical scanning speed and distance of travel. Such correspondence is particularly present in machines using a photoreceptive surface moving at constant speeds. In such machines, to obtain smaller magnification ratios, one generally scans a document at a faster rate and also extends the distance of travel so that a larger document may be reproduced using the available photoreceptive surface. The minimum magnification value in such machines is dictated by the platen size in the scan direction.

It is also known to switch and selectively terminate platen document scanning of constant velocity scanning means prematurely for smaller documents in a fixed magnification copier, e.g. the Xerox Corporation "1000" copier.

Extending the magnification range to include still smaller magnification values has not generally been possible because of the physical size limits on the platen and reproduction machine itself. In particular, the combination of a relatively small or conventional platen size together with small values of magnification points toward conflicting desire requirements.

OBJECTS OF THE INVENTION

It is an object of the invention to overcome the disadvantages of the prior art by providing an extended variable magnification range in a reproduction machine while utilizing a platen of conventional size.

Another object of the invention is to provide a range of relatively small magnification ratios in a reproduction machine which utilizes a fixed photoreceptor travel speed.

Another object of the invention is to provide a scan terminating or limiting means in a variable magnification reproduction machine having magnification values within the range of approximately 1.1 - 0.6.

Yet another object of the invention is to provide a scan distance limiting means in a variable magnification reproduction machine which employs a scanning system which generally increases the speed and travel distance of optical elements with decreasing magnification.

The variable magnification reproduction machine has a platen for holding a document to be scanned, document scanning means, image receptor means for receiving an image of the scanned document, imaging means for focusing an image of the document onto said receptor means, means for adjusting the imaging means for selecting between different document magnifications and for correspondingly changing the scanning rate of the document scanning means and means responsive to the selected magnification for limiting the scanning of the document scanning means to approximately the platen size.

BRIEF DESCRIPTION OF THE DRAWINGS

These and other objects of the invention will be apparent from the following detailed description taken in conjunction with the Figures wherein:

FIG. 10 is a fragmentary vertical sectional view, taken on the line 10—10 of FIG. 8;

FIG. 11 is an enlarged fragmentary horizontal sectional view, taken on the line 11—11 of FIG. 4;

FIG. 14 is a horizontal sectional view through the cable clutch, taken on the staggered section line 14—14 of FIG. 12.

DETAILED DESCRIPTION OF THE PREFERRED EMBODIMENT

The disclosed variable magnification reproduction machine utilizes a clutch mechanism which is actuated only for a selected range of magnifications to disengage the optical scanning elements from their driving means. The clutch disengagement occurs at a point in the scanning cycle at which the optical scanning elements have reached the end of the machine platen. Further, reduced magnifications are still possible with associated increases in optical scanning velocities although the scan distance is limited to approximately the platen size in the scan direction.

The variable magnification reproduction machine of the instant invention may be utilized to provide a continuously selectable magnification within a range set by machine size and physical requirements. Magnification may be defined as the ratio between the image or copy dimension and the object or document dimension. In the preferred embodiment described below, the magnification range is nominally 1.1 – 0.6. Magnifications less than unity represent physical reductions in size. Thus, a document having a dimension of 11 × 17 inches may be reduced using a magnification ratio of 0.647 to fit onto copy paper having a size of 8.5 × 11 inches.

Figure 1:
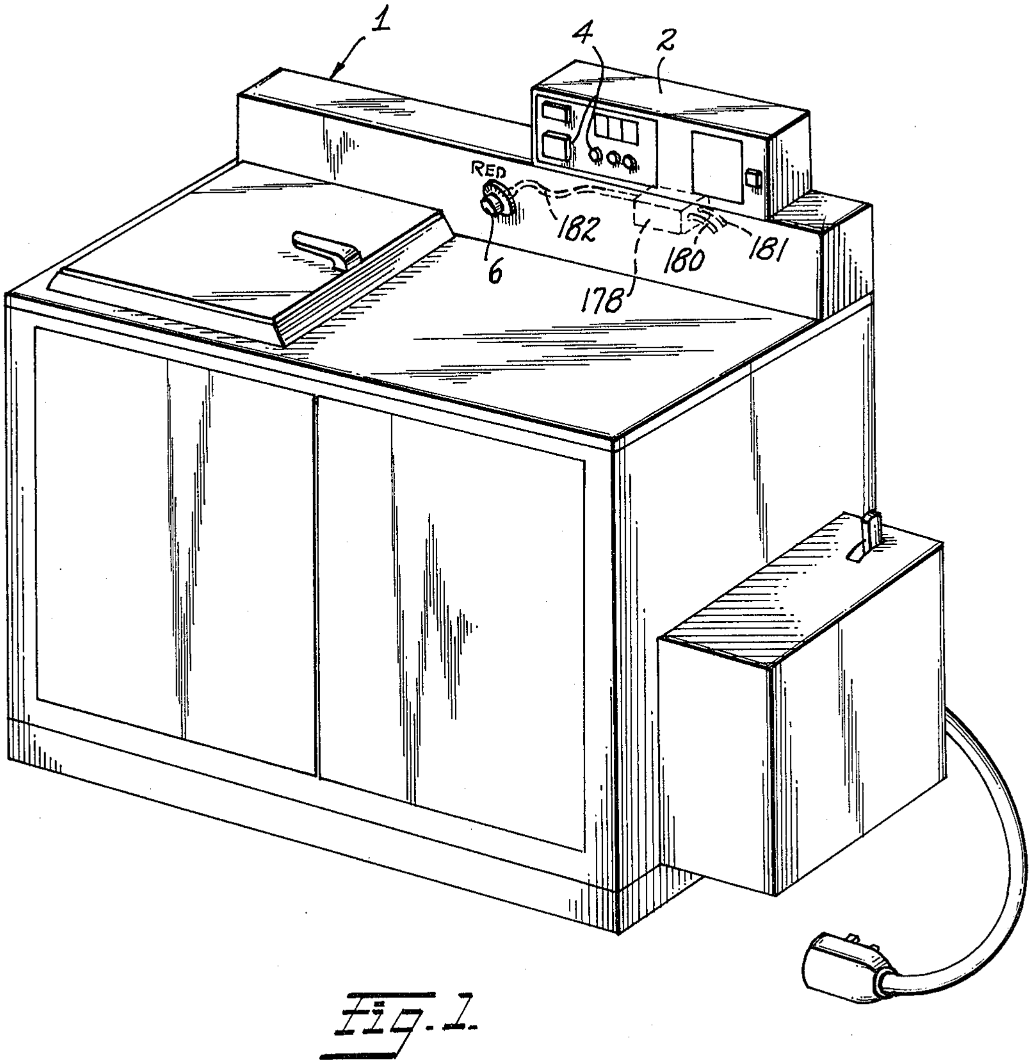
FIG. 1 is a perspective view of the duplicating machine of the present invention.

FIG. 1 represents a perspective view of the variable magnification reproduction machine 1 showing the control console 2 having a plurality of control buttons 4 thereon. These control buttons 4 may be used to initiate or stop the copy process, to set a desired copy quantity for multiple copy runs, or for other well known functions standard in the copier/duplicator art. The reproduction machine 1 has a magnification dial 6 which is settable by the operator to achieve any desired variable magnification within the available range. The magnification settable is continuous and is not limited to discrete values.

Figure 2:
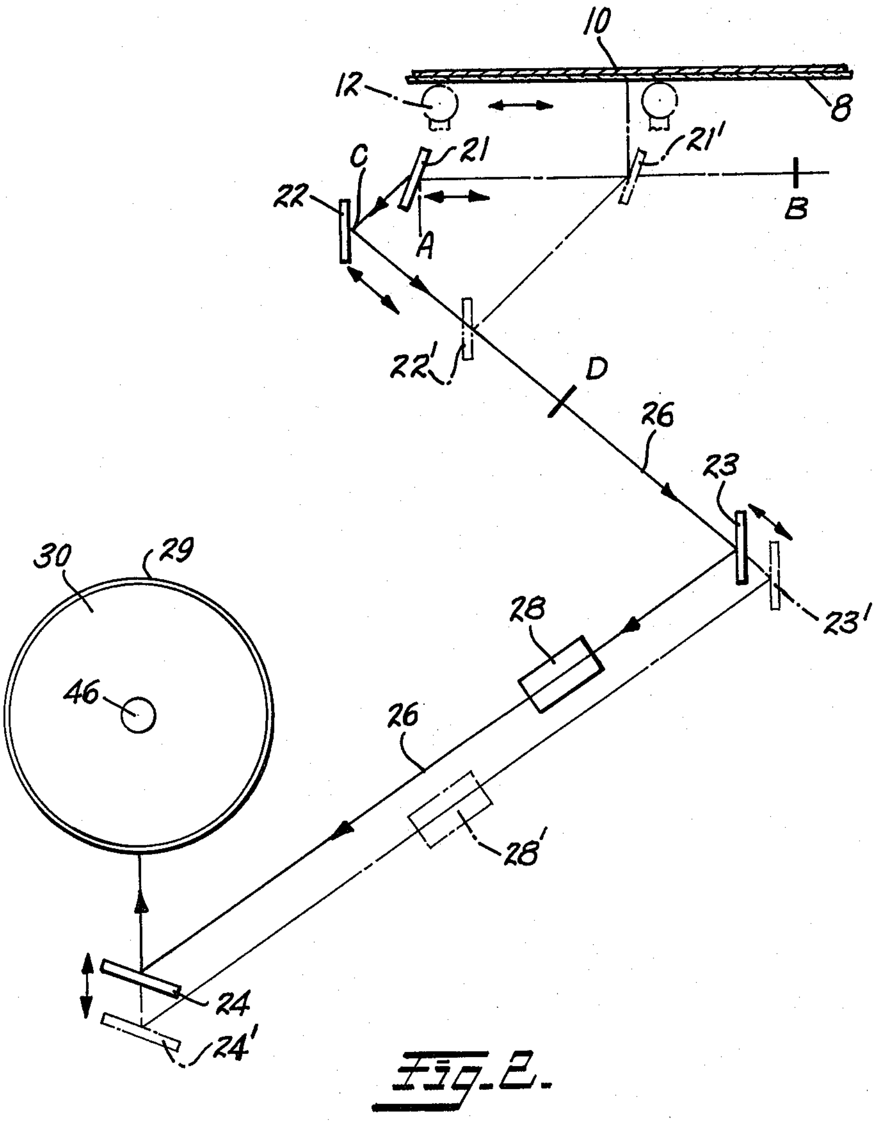
FIG. 2 is a representative view showing the principal optical elements of the invention.

FIG. 2 is a schematic illustration of the optical system of the invention. For simplicity, the mechanical support elements and connecting members have been omitted so that the optical elements may be readily ascertained. The machine has a document holding means comprising a platen 8 on which a document 10 is positioned and illuminated for reproduction. The document is illuminated by a lamp 12 which scans across the surface of the platen as illustrated by the arrows in FIG. 2. The optical system comprises first, second, third and fourth mirrors designated 21, 22, 23, and 24, respectively. Mirrors 21 and 22 are scanning mirrors in that they move relative to the document 10 in synchronism with the movement of lamp 12. The arrows adjacent mirror 21 and 22, respectively, indicate the direction of scan for these mirrors. The optical path of light reflected from the mirror surfaces is indicated by numeral 26 and is seen to extend from the document 10 to scanning mirrors 21 and 22 and subsequently to mirror 23. A lens 28 is positioned to intersect the light path 26 and the light image is subsequently reflected by means of mirror 24 to a photoreceptor surface 29 of, for example, a xerographic drum 30.

FIG. 2 also illustrates a second position for the scanning mirrors which is designated by numerals 21' and 22' corresponding to an intermediate point in the scan cycle. During one complete scan cycle, the mirror 21 moves from its start of scan position at point A to a point B which depends on the magnification setting, and back again to the start of scan position. At the same time and in synchronism therewith, mirror 22 moves from its starting position at point C to point D, which likewise depends on the magnification setting, and returns along the same path to point C. As can be seen in the drawings, the angular orientation of mirrors 21 and 22 remains fixed during a scan cycle and only their displacement relative to the document surface is changing. The portion of the optical path 26 extending from mirrors 22 to mirror 23 remains fixed in position for any given displacement of the mirrors 21 and 22. The geometry shown provides a constant optical path length from the platen 8 to the lens 28 during every position of the scanning mirrors 21 and 22 during the scan cycles. As such, the horizontal component of the velocity of mirror 22 is one-half the velocity of scanning mirror 21.

FIG. 2 further shows the lens and mirror arrangement for a different magnification setting of the reproduction machine 1. Thus, numeral 23' indicates the position of mirror 23 at the second magnification value as does numeral 28' and 24' indicate the new position for the lens 28 and mirror 24, respectively. The movement of mirrors 23 and 24 and lens 28 is continuously variable to achieve continuously variable magnification within the available range. Lens 28 has a fixed focal length, 14 inches, for example, and the lens and mirror arrangement maintain a focused image on the receptor means or photoreceptive surface 29 in a variable conjugate system. The mirror and lens movement is achieved by means of a common drive mechanism and separate cam arrangements as is more fully described below.

Figure 3:
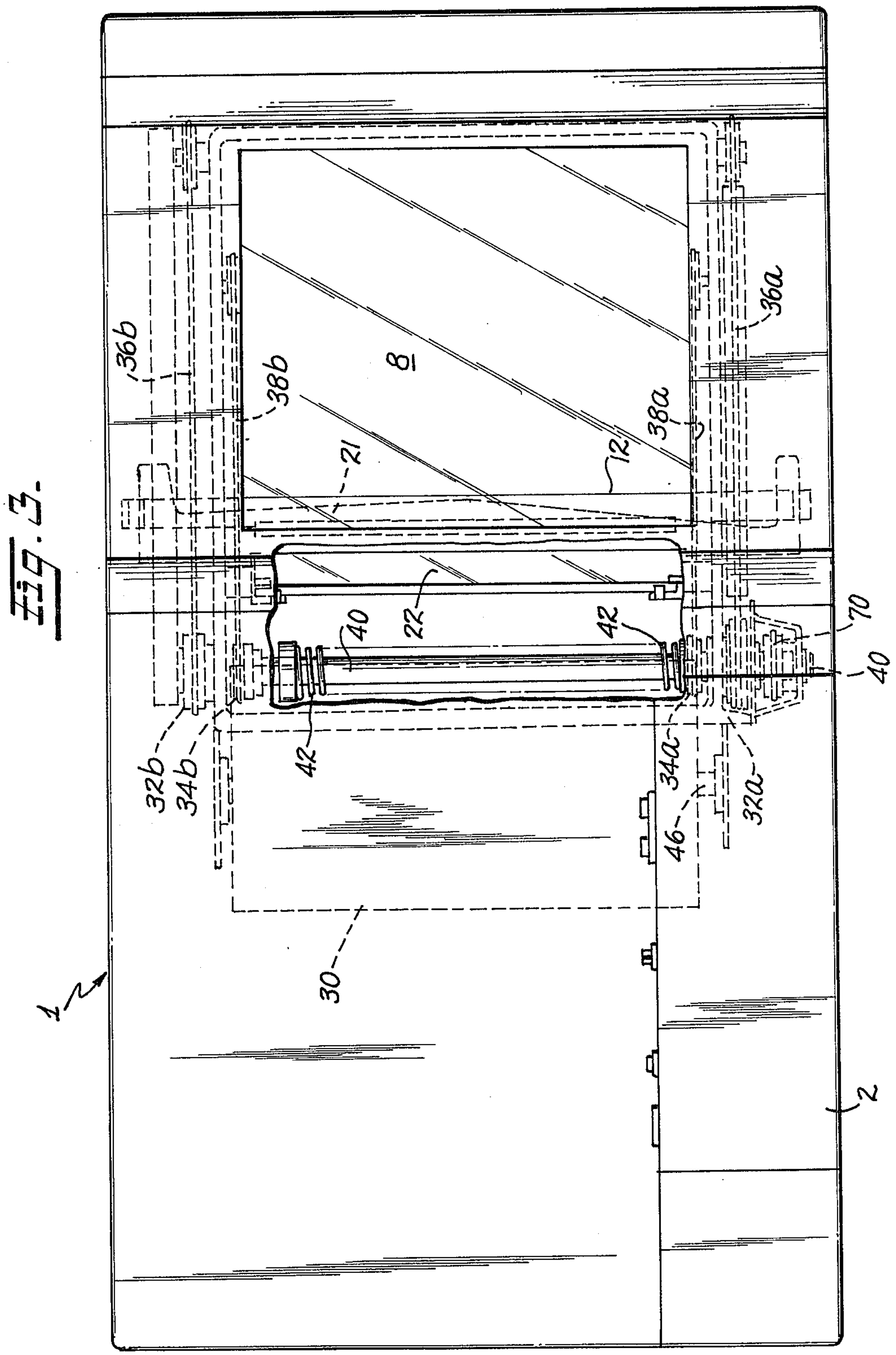
FIG. 3 is a plan view of the machine of the present invention, partly in section and showing the pulley arrangement for the upper mirrors at the beginning of the scanning cycle together with the retracting mechanism.
Figures 4, 4A:
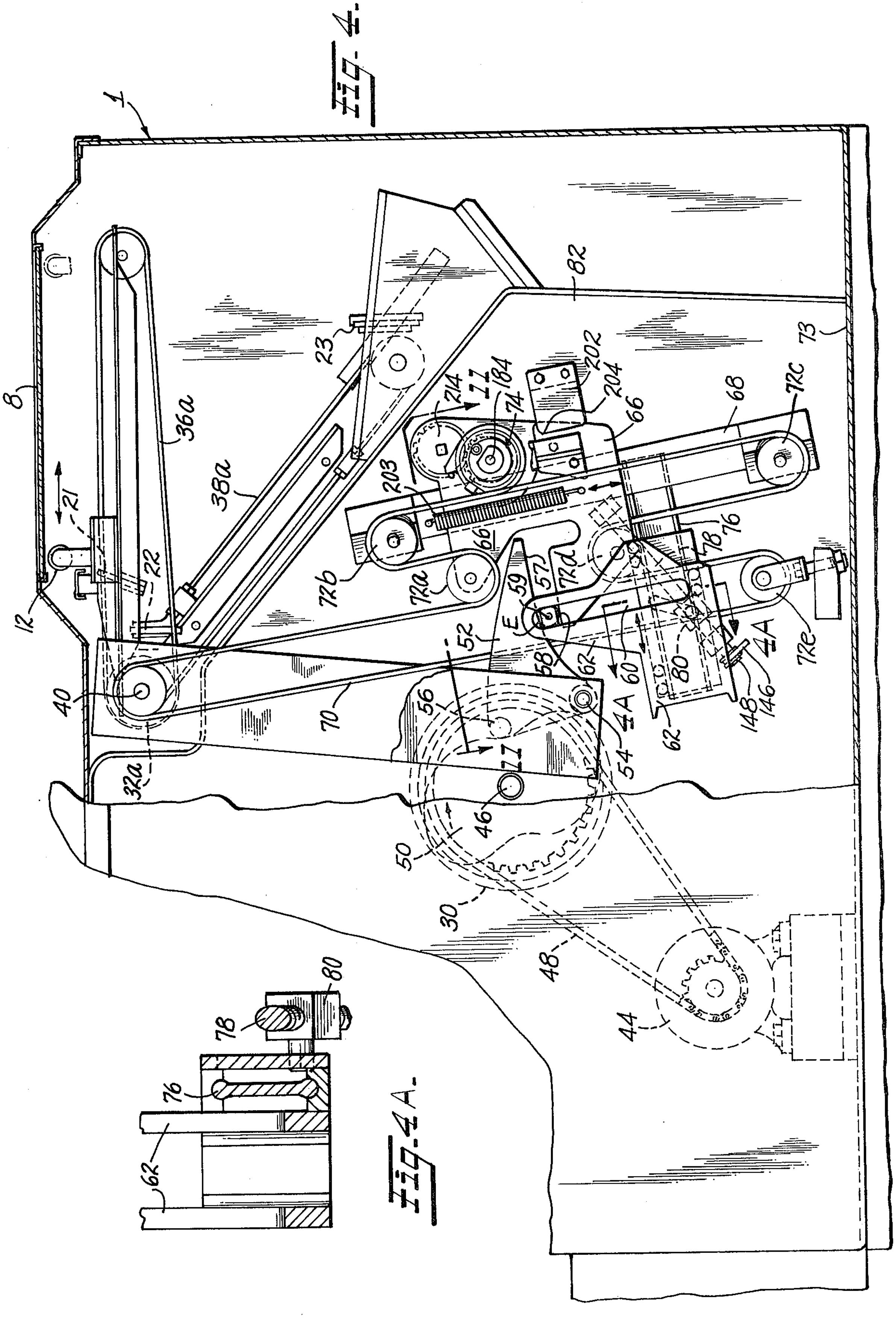
FIG. 4 is a rear elevational view of the machine of FIG. 1, partly in section, illustrating the arrangement for driving the scanning elements at different magnifications.
FIG. 4A is an enlarged fragmentary vertical sectional view taken on the line 4A—4A of FIG. 4.

FIG. 3 is a partially sectioned planned view showing the pulley arrangement for the scanning mirrors 21 and 22. Mirror 21 is driven by means of pulleys **32*a* and 32*b*, whereas mirror 22 is driven by means of smaller pulleys 34*a* and 34*b*. Cables 36*a* and 36*b* are attached to pulleys 32*a* and 32*b*, respectively, and, as best illustrated in FIG. 4, cables 36 are used to drive support means for both the mirror 21 and the lamp 12. Cables 38*a* and 38*b* are attached to pulleys 34*a* and 34*b*, respectively, and utilized to drive support means for the second scanning mirror 22. Pulleys 32 and 34 are secured to a mirror drive shaft 40 which acts against a torsion spring 42 during the forward scanning cycle. The torsion spring 42 is utilized during flyback to reposition the mirrors 21 and 22** at their start of scan position.

FIG. 4 is a rear elevational view of the reproduction machine 1 shown partially in section to indiate the driving mechanism for the scanning mirrors 21 and 22, as well as some of the apparatus utilized in changing the magnification. A main drive motor 44 is utilized to power a main drive shaft 46 by means of drive chain 48. Attached to the main drive shaft 46 is the xerographic drum 30 as well as a double lobed cam 50. A cam follower arm 52 is pivoted for rotation about a pin 54 by means of a roller 56 secured to one end of the cam follower arm for contact with the rotating cam 50. Arm 52 has a flat surface 57 which contacts a roller 58 which is retained by guide pin and block 59 in a slot 60 of a yoke 62. Flat surface 57 makes contact with roller 58 at a point designated E in the drawings. Roller 48 bears against a base member 64 of a trolley 66. The trolley 66 is mounted for slidable movement along a rail 68 as shown by the arrows on the trolley. The movement of the trolley along the rail 68 serves to rotate mirror drive shaft 40 via cable 70. A plurality of pulleys **72*a*–72*e* are provided to link the trolley or cable driving means 66 to the mirror drive shaft 40. Pulleys 72*a* and 72*d* are secured to the trolley 66; pulleys 72*b* and 72*c* are secured to the rail 68; and pulley 72*e* is secured to the machine base plate 73. A clutch assembly 74 is also shown attached to the trolley 66**. The operation of the clutch assembly and the driving mechanism are more fully explained below.

Figure 9:
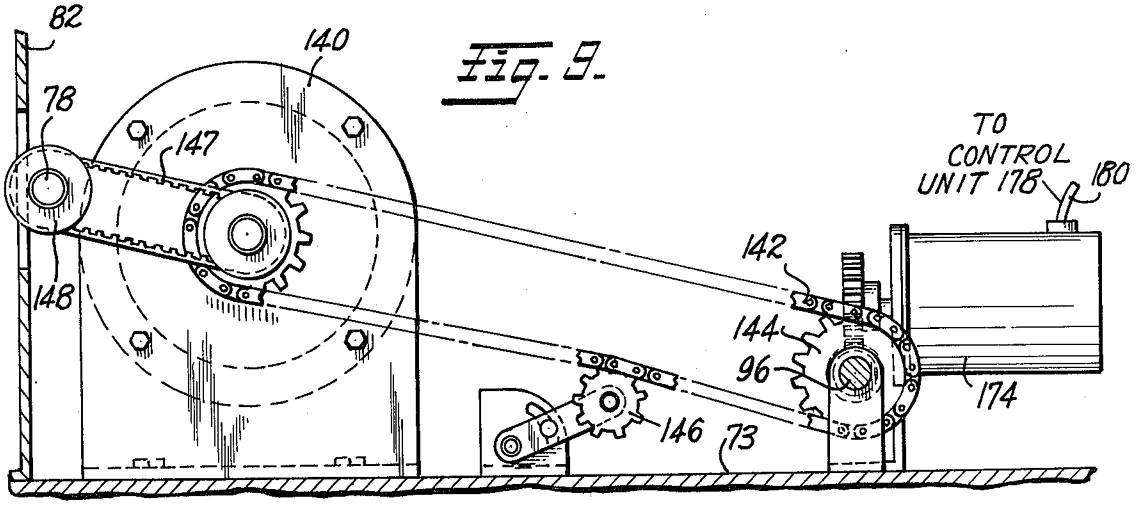
FIG. 9 is an enlarged vertical sectional view taken on the line 9—9 of FIG. 8.

Cam follower arm 52 is shown in its, upward position in FIG. 4, i.e., its extreme counterclockwise position, as is evident from the position of roller 56 in relation to the surface of the cam 50. Thus, contact point E is the extreme contact point for a given magnification between the flat surface 57 and the roller 58 corresponding to the left extreme positions for mirrors 21 and 22. For effecting a change in magification, the yoke 62 is mounted on a rail 76 so that the extreme contact point E is shifted to various positions along the flat surface 57 of the cam follower arm 52. The position of yoke 62 along rail 76 controls the extent of travel (end points B and D of FIG. 2) and the speed of scanning mirrors 21 and 22. Yoke 62 is driven along the rail 76 by means of a drive screw 78 and a drive block 80 as shown in FIG. 4A. Drive screw 78 is powered by means of a timing belt or roller chain arrangement as seen in FIGS. 9 and 10. A more detailed view of the linkage between drive screw 78 and yolk 62 is shown in FIG. 11 which is a fragmentary sectional view taken along lines 11—11 of FIG. 4.

The rails 68 and 76 are secured to a support panel 82 behind which is housed the movable lens 28 and mirrors 23 and 24.

Figures 4B, 5:
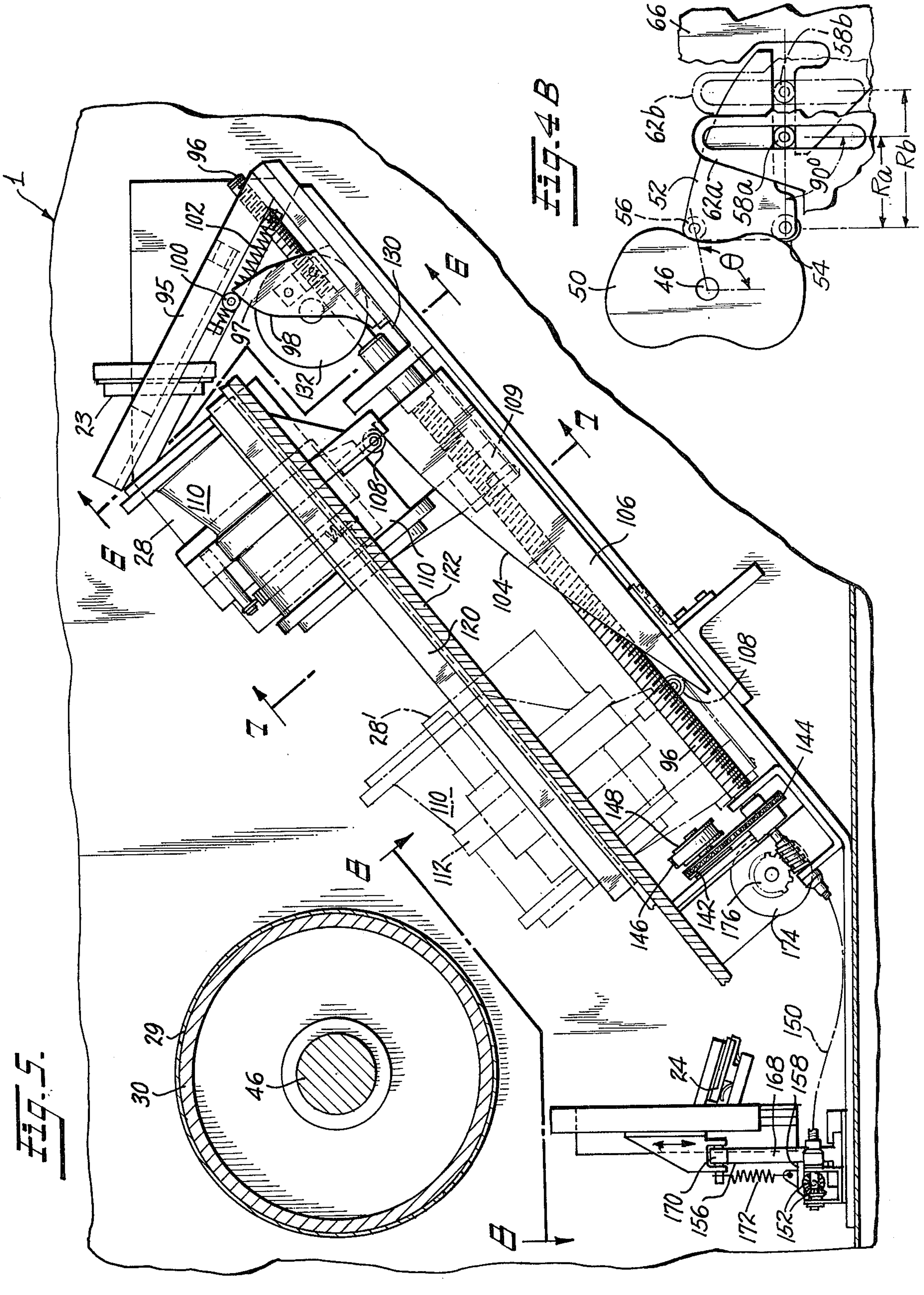
FIG. 4B is a schematic illustration of the yoke and cam follower arm of FIG. 4 for two different values of magnification.
FIG. 5 is an enlarged fragmentary vertical sectional view, showing the drive mechanism for the lens and the two lower mirrors.

FIG. 4B is a schematic illustration of the position of yoke 62 for two different magnifications, $M_a$ and $M_b$, with cam 50 at the same positon $\theta$ relative to a reference $\theta = 0$ position. The yoke is labelled 62*a* and 62*b* corresponding to positions of the yoke for magnification $M_a$ and $M_b$ respectively where $M_b < M_a$. Yoke 62 is positioned as a function of magnification to change the effective radius R of the follower arm. R is defined as the distance from the center of the rotation of arm 52 measured normally to the slot 60 in yoke 62, which constrains motion of roller 58 to straight line motion (as is the motion of trolley 66).

In changing magnification, it is desirable to maintain the same registration position on the platen so that the operator may utlize the same registration guides for all values of magnification. When magnification is changed, the yoke is positioned so that R is inverse to magnification, i.e., $R_b/R_a = M_b/M_a$. To achieve common registration for all values of R ($R = R_a$ or $R = R_b$), it is necessary to maintain the optical axis located at the registration position when the cam 50 is at position $\theta$. To maintain this relationship, arm 52 is shaped such that at position $\theta$, a line extending through the center of pin 54 and roller 58 is perpendicular to the slot in yoke 62. This arrangement satisfies the unique requirement of an optical scanning device with variable magnification that scan velocity be equal to photoreceptor velocity divided by magnification, and with initiation of constant velocity optical scanning (i.e. document registration position) invariable with magnification.

FIG. 5 illustrates the drive mechanism for the lens 28 and the mirrors 23 and 24 to effect a change in magnification of the apparatus. Lens 28 is shown in an upper position, as well as in a lower position 28'. The lower position 28' places the lens closer to the xerographic drum surface 29 than in the upper position and thus corresponds to a greater reduction of the document size on the drum surface. In producing the change in magnification, the mirrors 23 and 24 must shift position so that the image projected on the drum 30 remains in focus. This is achieved by lengthing the optical path by means of rollers and cams all operated by a single driving means.

Figure 6:
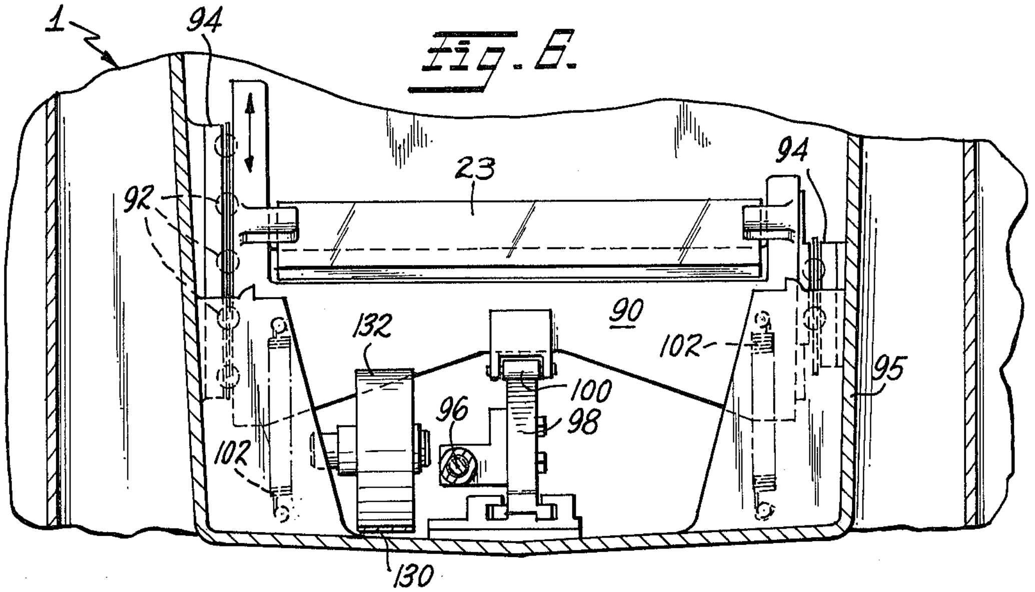
FIG. 6 is an enlarged fragmentary vertical sectional view taken on the line 6—6 of FIG. 5.

The apparatus for producing the change in magnification is illustrated in FIG. 5 with various sub-features shown in FIGS. 6–10. Mirror 23 is secured by means of a support or mirror carriage 90 which is slidably movable along the direction of the arrows as shown in FIG. 6. Ball bearings 92 provide a rolling contact between the mirror carriage 90 and "V" shaped, fixed track members 94 which are secured to a frame 95. A lead screw 96 is rotated to effect movement of a cam 97 having cam surface 98 which bears against a roller 100. Roller 100 has an axial support member which is secured to the mirror carriage 90 so that the movement of the cam 97 along the axis of lead screw 96 causes a corresponding movement of the mirror carriage 90 along the fixed track members 94. Suitable spring means 102 are connected to the mirror carriage 90 and a frame 95 to provide additional biasing of the roller against the cam surface 98.

Figure 7:
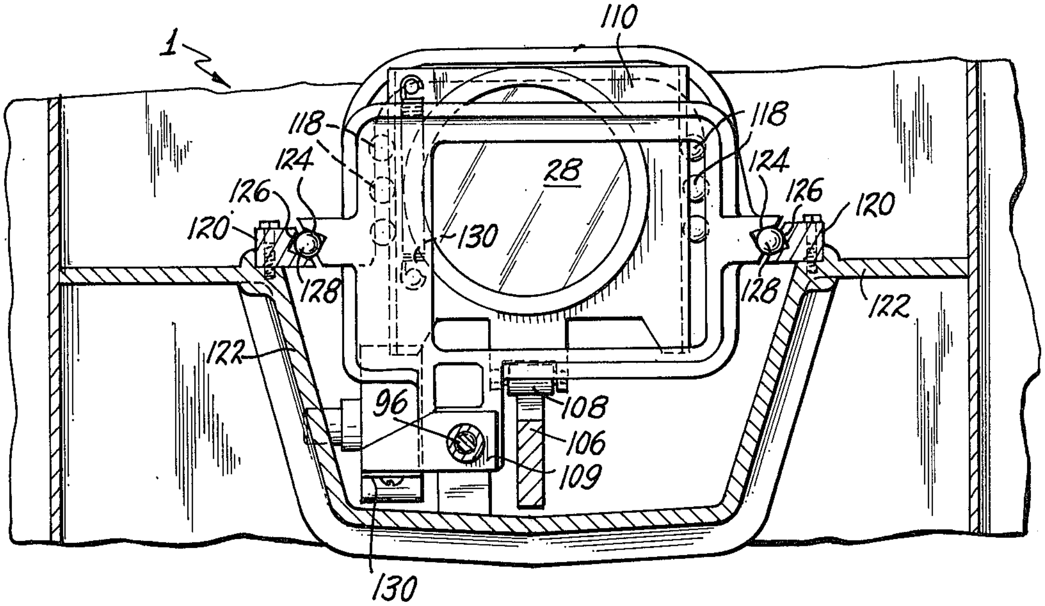
FIG. 7 is a fragmentary vertical sectional view taken on the line 7—7 of FIG. 5.
Figure 8:
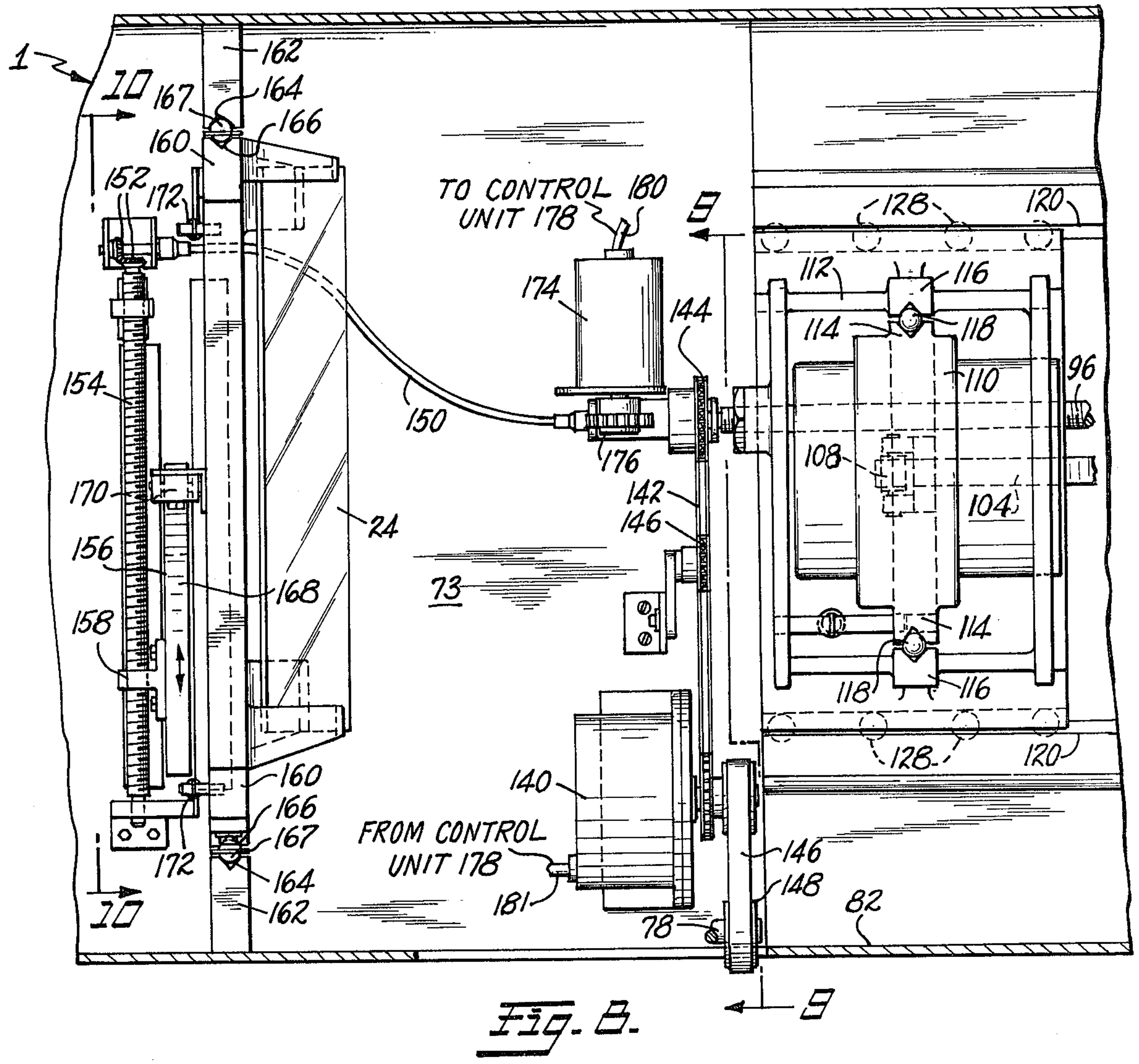
FIG. 8 is a fragmentary horizontal sectional view, taken on the line 8—8 of FIG. 5, with the lens carriage shown in full lines.

Lead screw 96 also provides the means for driving lens 28 along a lens cam surface 104 of lens cam 106. Roller 108 bears against lens cam surface 104 and has an axial support member attached to a lens carrier 110. A bracket and a traveling nut assembly 109 serves to connect the lead screw 96 to the lens carrier 110. The lens carrier 110 is slidably movable within a lens housing 112 as is best illustrated in FIGS. 7 and 8. "V" shaped tracks 114 and 116 (similar to tracks 94) are provided on lens carrier 110 and lens housing 112, respectively, to secure ball bearings 118 therebetween.

Lens housing 112 is movable along fixed rails 120 which are secured to a support member 122 as best seen in FIG. 7. "V" shaped tracks 124 and 126 provide sliding contact for housing 112 in cooperation with additional ball bearings 128. Spring means 130 connecting the lens carrier 110 to the lens housing 112 serve to bias the roller 108 against the lens cam surface 104. Thus, as the lead screw 96 rotates, it forces the lens carrier 110 (and lens 28 secured thereto) to move along the lens cam surface 104. Assuming the lens 28 is to move to the position shown by lens 28' in FIG. 7, the lens housing 112 moves along fixed rails 120 whereas the lens carrier 110 (and lens 28) move both along the fixed rails 120 and transverse thereto, i.e., slide downward within the lens housing 112 along the longitudinal direction of "V" shaped tracks 114 and 116.

Attached to the bracket and traveling nut assembly 109 is a counter balance assembly comprising a steel spring tape 130 and spring loaded power reel 132.

As shown in FIGS. 8–10, the lead screw 96 is powered by a drive motor 140 which is connected to the lead screw 96 by means of a chain 142 and sprocket wheel 144. An idler wheel 146 may also be provided for chain adjustment as shown. Belt 147 connects the drive motor 140 to the drive screw 78 via a pulley 148 attached to the drive screw 78. Drive motor 140 is also utilized to move mirror 24 by means of the drive chain 142, sprocket wheel 144, flexible shaft drive 150, bevel gears 152, and lead screw 154. The lead screw 154 is connected to drive a cam 156 associated with mirror 24 by a bracket and traveling nut assembly 158 as best shown in FIG. 10. Similar to the mirror carriage support for mirror 23, mirror 24 is provided with a mirror carriage 160 which is slidably movable within a frame 162 having "V" shaped tracks 164 thereon. Additional "V" shaped tracks 166 are provided on the mirror carriage 160 and ball bearings 167 are secured between tracks 164 and 166. A cam surface 168 of cam 156 bears against a roller 170 which has axial support means connected to the mirror carriage 160. Spring bias means 172 are also provided to maintain the rollers 170 against the cam surface 168.

It is thus seen that a single driving means is provided to move the cams 97 and 156 associated with the mirror 23 and mirror 24, respectively and to correspondingly move lens 28. Drive motor 140 is controlled by the operator setting a desired magnification ratio on dial 6 (FIG. 1). A linear potentiometer 174 (FIG. 8) senses the rotation of lead screw 96 via worm gear 176 and signals are sent to a control unit 178 (FIG. 1) via lines 180. The control unit 178 may comprise a simple difference amplifier or comparison circuit for powering drive motor 140 via lines 181 when the voltage from linear potentiometer 174 differs from a reference voltage set by magnification dial 6 via lines 182. The mirrors 23 and 24 and lens 28 all move simultaneously in response to the actuation of drive motor 140. When magnification is changed, the optical center of lens 28 is maintained aligned in the optical path between mirrors 23 and 24 and a focused image on the surface 29 of xerographic drum 30 is maintained because of the automatic positioning of mirrors 23 and 24 and lens 28 via cams 97, 156 and 106 respectively.

It is important to note that the drive motor 140 controls the movement of the mirrors 23, 24 and lens 28 as well as the movement of drive screw 78. Drive scrw 78 serves to displace yoke 62 (FIG. 4) along rail 76 thereby controlling the extent of travel and speed of trolley 66 which in turn controls the extent of travel and speed of scanning mirrors 21 and 22. For higher document reductions (lower magnifications), the yoke 62 moves to the right along rail 76 of FIG. 4. The contact point E between surface 57 and roller 58 thus also moves to the right defining a larger distance R between the slot in yoke 62 and pivot pin 54. The larger effective radial distance R for follower arm 52 serves to increase the speed of trolley 66 in relation to smaller initial radial distances (lower document reduction or higher magnificaton). The increase in speed of trolley 66 in turn serves to increase the speed of mirror scanning for larger document reductions at the required rates so that synchronism is maintained with the approximately constant average velocity rotation of the xerographic drum 30. Thus, by utilizing a positive, integral, mechanical linkage with appropriately shaped cam surfaces, the movement of scanning mirrors 21 and 22 is correlated to the desired magnification as effected by the position of mirrors 23 and 24 and lens 28.

Inasmuch as the magnification determines the extent of travel AB and CD for mirrors 21 and 22, respectively, the design requirement for surface 57 and cam 50 is to have the scanning mirrors 21 and 22 traverse the required distances at a time determined by the constant rotation of a fixed sector of the photoreceptor surface 29. The fixed sector of the photoreceptor surface corresponds to the size of copy paper utilized.

Figure 12A:
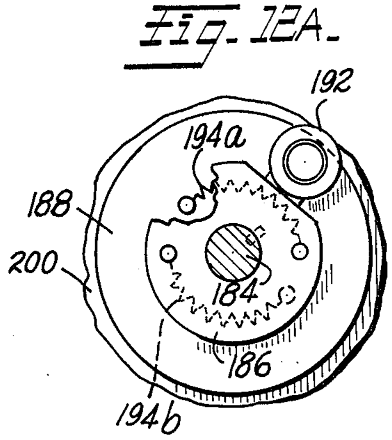
FIG. 12A is a fragmentary elevational view similar to FIG. 12 showing the arrangement of the return springs for the cable clutch elements.
Figure 12:
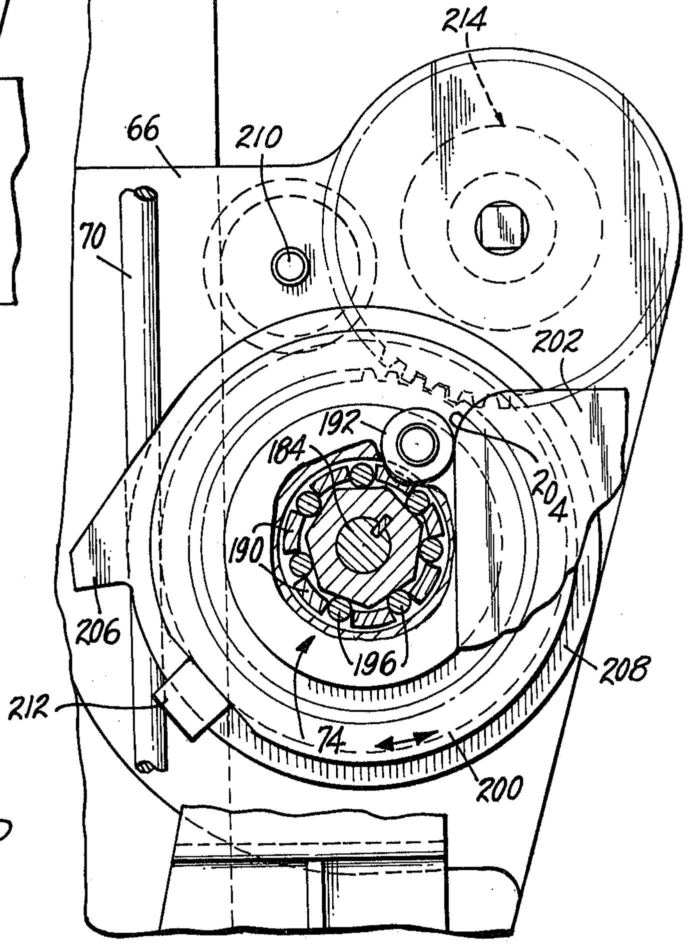
FIG. 12 is an enlarged fragmentary elevational view, partly in section, taken on the line 12—12 of FIG. 11, showing the cable clutch in its engaged position.

The clutch assembly 74 is shown in FIGS. 11-14. The clutch assembly comprises a fixed shaft 184 onto which is secured a collar 186 and cam 198. A roll cage 188 having roll spacers 190 and a connecting trip pin 192 is partially rotatable about shaft 184 fo engaging and disengaging the clutch. Springs **194*a* and 194*b* mounted at their ends to the collar 186 and roll cage 188 serve to bias the clutch into engagement as shown in FIGS. 12 and 12A. The clutch is engaged when cage 188 drives the rollers 196 into the wedge defined by the outer surface of a fixed cam member 198 and the inner surface of the driver or pulley member 200. When the clutch is engaged, it is locked against clockwise rotation but is free to rotate counterclockwise. When the clutch is disengaged, the pulley 200** is free to rotate in both directions.

Figure 13:
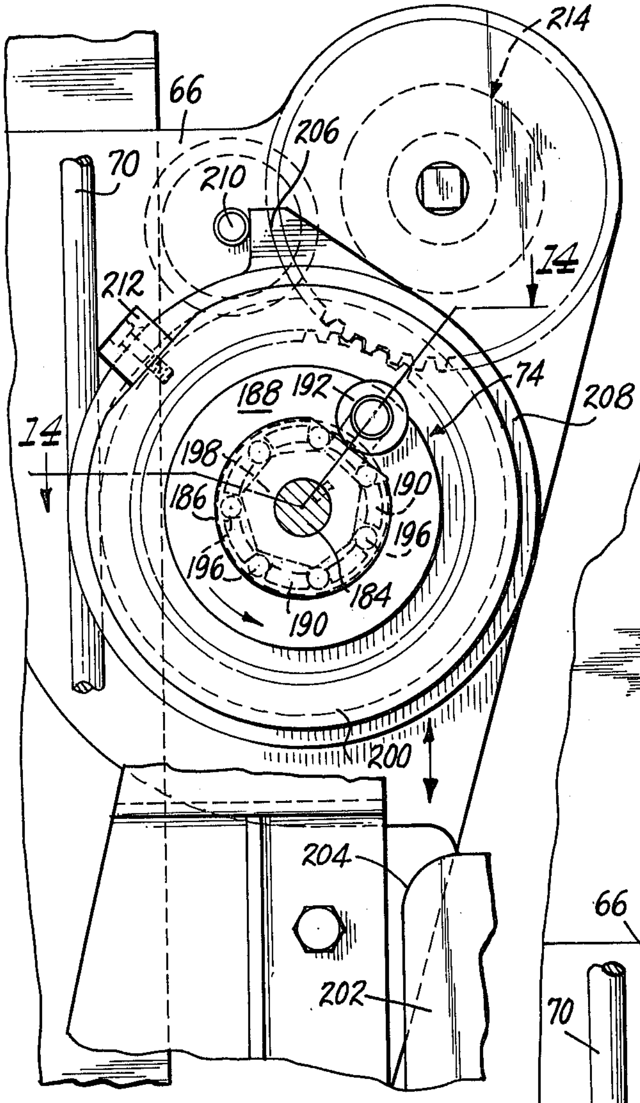
FIG. 13 is a view, similar to FIG. 12, but showing the cable clutch in its disengaged position.

The clutch mechanism serves as a means to terminate the scanning of mirrors 21 and 22 so that for relatively small magnifications (large reductions), the scanning mirrors will only scan the length of the platen 8 even though the trolley 66 is driven further downward along rail 68 by the cam follower arm 52. Since the engaged clutch assembly 74 is locked against the clockwise rotation, the movement of the trolley 66 downward drives the scanning mirrors 21 and 22. In order to terminate the scanning of mirrors 21 and 22 when they have scanned the length of the platen 8, there is provided a trip plate 202 secured to the support panel 82 and having a cam surface 204 which makes contact with trip pin 192 to disengage the clutch. The clutch is disengaged since trip pin 192 is rotated slightly counterclockwise which in turn rotates the roll cage 188 to release rollers 196 (FIGS. 4 and 13). The pulley 200 then rotates clockwise and plays out the connecting cable 70 so that no further driving tension is exerted on mirror drive shaft 40. As a result, the mirror drive shaft 40 stops and begins to rotate counterclockwise biased by the torsion spring 42 (FIG. 3). The mirrors 21 and 22 thus begin flyback to their start of scan position. After the trolley 66 has reached its most downward extent corresponding to the most extreme clockwise rotation of cam follower arm 52, the trolley 66 begins its upward motion biased by a spring 203 (FIG. 4). When the trip pin 192 leaves the cam surface 204 of plate 202, the clutch is once again engaged and thus locked to clockwise rotation of pulley 200. However, the pulley 200 continues to rotate in the counterclockwise direction ("Climbing-up" the cable 70) until a lug 206 in back plate 208 comes in contact with stop pin 210. Back plate 208 is secured to rotate with pulley 200, and lug 206 and stop pin 210 serve to provide registration of the clutch assembly for a subsequent scan. It is pointed out that the total clockwise rotation of the pulley 200 is approximately 270° and that the cable 70 is fastened to the pulley 20 by an anchor block 212 as most clearly shown in FIG. 12.

The clutch assembly 74 is also provided with a damper 214 coupled to the pulley 200 by a gear arrangement as shown in FIGS. 12 and 13. A clutch assembly operable as described above is available from Hilliard Corporation, Elmira, New York, and identified by their part number 1-1-6.

As is readily apparent, the clutch actuating means or the plate 202 may be replaced by electrical actuating means such as a solenoid energized at the appropriate time during document scanning.

The clutch assembly 74 enables a continuing and positive interlock between the main drive motor 44 and the main scanning optical drive elements such as the yoke 62, trolley 66, and scanning mirrors 21 and 22. Further, the clutch is operative into disengagement only when specific ranges of magnifications are desired (the smaller values), and is not operated with every scan cycle, thus providing a degree of isolation for a possible clutch failure mode of operation.

The utlization of a scan terminating or limiting means such as the clutch assembly permits both small and large document magnification ratios to be employed using a platen capable of supporting many widely used document sizes, up to 12 × 17 inches, for example (12 inches in the scan direction). Without some means for limiting or terminating the scanning process at some finite scan point, corresponding to a predetermined magnification (0.75, for example) as dictated by the document platen size, one would be prohibited from using smaller magnifications than the aforesaid predetermined magnification inasmuch as the scanning mechanism would be mechanically driven beyond its physical limits. Thus, in order to gain a greater flexibility of operation and the ability to obtain magnifications less than (greater document reductions) the aforesaid predetermined magnification, a scan limiting or terminating means such as the clutch assembly described above may be employed.

Figure 15A:
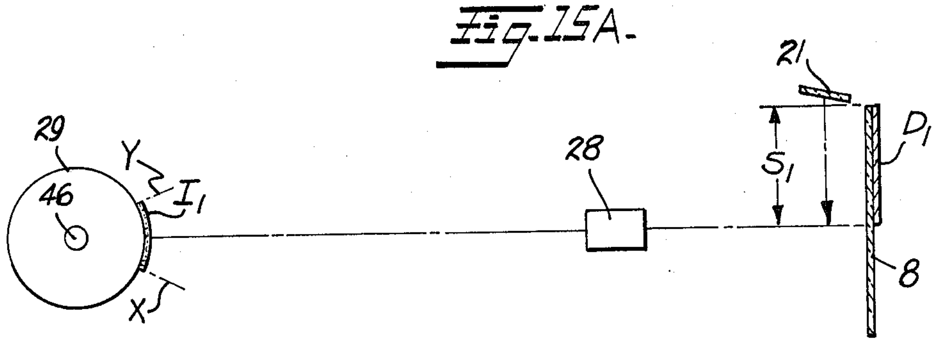
FIGS. 15A–15C are diagrammatic views of documents and images for various values of magnifications.
Figure 15B:
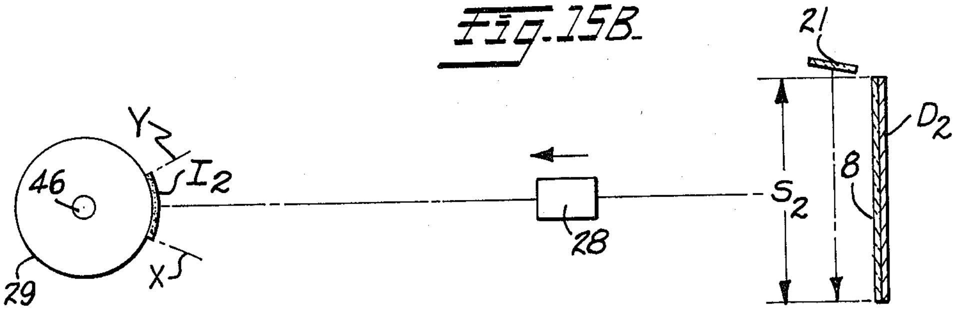
Figure 15C:
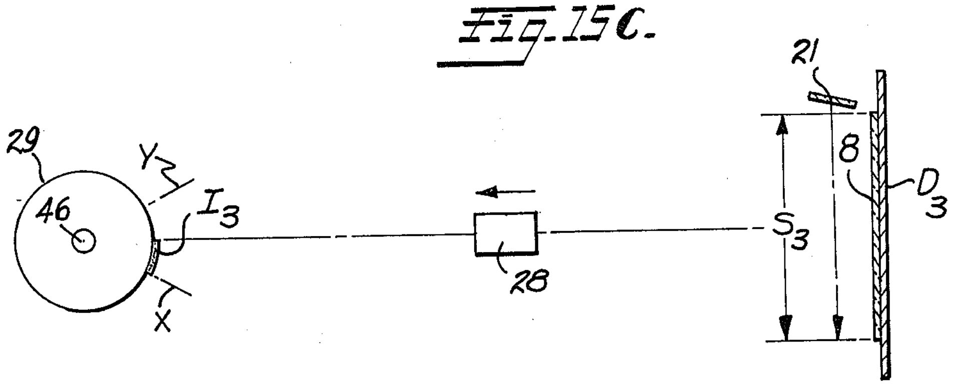

FIGS. 15A–15C show diagrammatically the result of using a scan terminating means in accordance with the principles of the instant invention. Only the basic optical and mechanical features are illustrated for simplicity and subscripts 1–3 correspond to FIGS. 15A–15C, respectively. Platen 8 holds a document D which forms an image $I_1$ on the photoreceptor surface 29. The magnification is determined by the relative position of lens 28 in relation to the surface 29, and the magnification is shown decreasing in value in the progression from FIG. 15A to FIG. 15C (increasing reduction ratio). The arc X-Y on surface 29 is the maximum surface sector allocated to receive the image I.

The document D forms the object as scanned by element 21 through the distance S. Assume that it is desired to choose values of magnification within a first range (higher range) such that the maximum image sector shown as $I_1$ and $I_2$ on surface 29 is utilized as in FIGS. 15A and 15B. In an electrostatic copying machine, the maximum image sector $I_2$ is determined by the largest copy to be produced in the scan direction. Within this first range, in going to smaller values of magnification, the lens 28 is moved closer to surface 29 and the scanning distance S is increased i.e., $S_2 > S_1$, and the scanning velocity is also increased as the drum rotation speed is fixed. In this case one may copy a document, $D_2$, which is larger than document $D_1$. Suppose now that one selects an even smaller value of magnification as seen by going from FIG. 15B to FIG. 15C. The object dimension (in the scan direction) cannot increase as the platen size is fixed and thus $S_2 = S_3$. Now, however, since the magnification value is smaller and the velocity of element 21 increased accordingly, the image $I_3$ formed on surface 29 has an arc dimension smaller than the maximum allocated surface arc. Images $I_3$ having a dimension smaller than the maximum size arc allocated, define a second range of magnification values which is contiguous with but smaller than the first range of magnification values. Within the first range of magnification values, the scanning velocity and distance of the optical elements (mirrors 21 and 22) increase with decreasing magnification; within the second range only the scanning velocity increases with decreasing magnification as the scanning distance is fixed to approximately the platen size. As a result, the magnification range of the reproduction machine is extended to include the second range of magnification values while maintaining a fixed drum rotation speed and a practical size limitation on the platen. This is of significant practical value in making copies of documents where the aspect ratios of the document is greater than the aspect ratio of the copy.

It is evident that the principles of the reproduction machine of the instant invention may be incorporated in alternate optical systems such as those disclosed in U.S. Pat. Nos. 3,499,374 and 3,697,166. Thus, the scanning direction need not be at right angles to the axis of revolution of the photoreceptor surface, but may be oriented parallel thereto.

It is also evident that a zoom lens may be utilized in place of the fixed focal lens described above and that the motor for driving the zoom lens can also drive the document scan regulating means and control the scan length.

Altough the invention has been described with reference to the preferred embodiments, it is to be understood that changes and modifications may readily be made by those skilled in the art without deviating from the spirit and scope of the present invention defined by the appended claims.

We claim:

1. A variable magnification reproduction machine comprising:
holding means comprising a platen for holding a document,
document scanning means for scanning a document at said platen,
image receptor means for receiving an image of said document scan by said document scanning means,
imaging means for focusing an image of said document onto said receptor means,
means for adjusting said imaging means for selecting between different document magnification values; and
means for correspondingly changing the scanning rate of said document means for each value of said magnification values and correspondingly changing the distance traveled for only some of said magnification values whereby the distance traveled by said document scanning means is limited to a predetermined distance which equals approximately the size of said platen.

2. A variable magnification reproduction machine as recited in claim 1 further comprising means for maintaining a fixed document registration position on said platen for different document magifications.

3. A variable magnification reproduction machine as recited in claim 1 wherein said means for changing the distance traveled by said document scanning means comprises clutch means mechanically linked to said document scanning means.

4. A variable magnification reproduction machine as recited in claim 3 wherein said scanning means comprises cable means and cable driving means and said image receptor means comprises a movable photoreceptive surface and wherein the means for changing the scanning rate of said scanning means comprises:
a cam mounted for rotation in synchronism with the movement of said photoreceptive surface,
cam follower means mounted for pivotal movement by said cam, a portion of said cam follower means positioned for contact with said cable driving means, and
means for varying the portion of said cam follower means for contact with said cable driving means.

5. A variable magnification reproduction machine as recited in claim 4 wherein said means for varying the portion of said cam follower means for contact with said cable driving means is connected to said means for adjusting said imaging means.

6. A variable magnification reproduction machine as recited in claim 5 wherein said imaging means comprises a fixed focal length lens and said means for adjusting said imaging means comprises means for moving said imaging means in relation to said photoreceptive surface.

7. A variable magnification reproduction machine as recited in claim 6 wherein said means for moving said imaging means comprises:
lens carrier means for securing said lens,
roller means attached to said lens carrier means, first cam surface means positioned for contact with said roller means, and motor means for relatively moving said first cam surface means and said roller means.

8. A variable magnification reproduction machine as recited in claim 7 wherein said scanning means comprises first and second movable reflector means.

9. A variable magnification reproduction machine as recited in claim 8 further comprising additional reflector means and means for moving said additional reflector means for continual optical alignment with said lens and for continued proper focus of said document onto said photoreceptive surface for different values of magnification.

10. A variable magnification reproduction machine as recited in claim 9 wherein said means for moving said additional reflector means comprises:

reflector carrier means for securing said additional reflector means, additional roller means attached to said reflector carrier means, and additional cam surface means positioned for contact with said additional roller means.

11. A variable magnification reproduction machine as recited in claim 10 wherein said additional reflector means comprises third and fourth reflector means, each associated with one additional roller means and one additional cam surface means, said first and additional cam surface means being movable by said motor means.

12. A variable magnification reproduction machine as recited in claim 3 wherein said scanning means comprises:

carriage means for transporting document illuminating means, means for moving said carriage means, said carriage moving means comprising a plurality of pulleys, cable means interconnecting said pulleys and trolley means for moving said cable means, said clutch means connected to said cable means and movable by said trolley means, and actuating means fixed relative to said clutch means for actuating said clutch means.

13. A variable magnification reproduction machine as recited in claim 12 wherein said clutch means is mounted on said trolley means and said actuating means is fixed relative to said trolley means.

14. A variable magnification reproduction machine as recited in claim 12 wherein said means for moving said carriage means comprises means for varying the speed of said trolley means.

15. A variable magnification reproduction machine as recited in claim 12 wherein said means for adjusting said imaging means comprises means for selecting any of a plurality of document magnifications within a continuous range of magnifications.

16. A variable magnification reproduction machine as recited in claim 15 wherein said continuous range of magnifications is approximately 1.1 to 0.6.

17. A variable magnification reproduction machine as recited in claim 1 wherein said means for adjusting said imaging means comprises means for selecting any of a plurality of document magnifications within a continuous range of magnifications.

18. A variable magnification reproduction machine as recited in claim 17 wherein said continuous range of magnification is approximately 1.1 to 0.6.

19. A variable magnification reproduction machine as recited in claim 17 further comprising means for maintaining a fixed document registration position on said platen for different magnifications.

20. A variable magnification reproduction machine as recited in claim 1 wherein said imaging means comprises a fixed focal length lens and said means for adjusting said imaging means comprises means for moving said imaging means in relation to said image receptor means.

21. A variable magnification reproduction machine as recited in claim 20 wherein said means for moving said imaging means comprises:

lens carrier means for securing said lens, roller means attached to said lens carrier means, first cam surface means positioned for contact with said roller means, and motor means for relatively moving said first cam surface means and said roller means.

22. A variable magnification reproducton machine as recited in claim 21 wherein said scanning means comprises first and second reflector means.

23. A variable magnification reproduction machine as recited in claim 22 further comprising additional reflector means and means for moving said additional reflector means for continuing optical alignment with said lens and for continued proper focus of said document onto said image receptor means for different values of magnification.

24. A variable magnification reproduction machine as recited in claim 23 wherein said means for moving said additional reflector means comprises:

reflector carrier means for securing said additional reflector means, additional roller means attached to said additional reflector means, and additional cam surface means positioned for contact with said additional roller means.

25. A variable magnification reproduction machine as recited in claim 24 wherein said additional reflector means comprises third and fourth reflector means each associated with one additional roller means and one additional cam surface means, said first and additional cam surface means being movable by said motor means.

26. A variable magnification reproduction machine as recited in claim 25 wherein said motor means is connected to said means for limiting the scanning of said document scanning means.

27. A method of extending to a second range the magnification values in a variable magnification reproduction machine employing a scanning optical element, said scanning optical element scanning documents for a first range of magnification values by:

increasing the scanning velocity of said scanning element as said magnification values decrease within said first range of magnification values, and increasing the scanning distance of said scanning element as said magnification values decrease within said first range of magnification values, said method comprising the steps of:

increasing the scanning velocity of said scanning element as said magnification values decrease within said second range of magnification values, and maintaining said scanning distance of said scanning element limited within a maximum predetermined distance as said magnification values decrease within said second range of magnification values, said second range of magnification values being smaller than said first range of magnification values thereby extending the range of magnification in said reproduction machine to include said second range of magnification values.

28. A method as recited in claim 27 wherein said second range of magnification values is contiguous with said first range of magnification values.

29. A method as recited in claim 27 wherein the steps of maintaning said scanning distance in said second range of magnification values comprises the step of intermittently disengaging a portion of a scanning optical element driving means.

30. A method as recited in claim 29 wherein said disengaging occurs during each scan of said scanning optical element.

31. A method as recited in claim 27 wherein said step of maintaining said scanning distance of said scanning element limited within a maximum predetermined distance comprises the step of maintaining said scanning distance substantially constant within said second range of magnification values.

* * * * *